(12) United States Patent
Faupel et al.

(10) Patent No.: US 6,349,334 B1
(45) Date of Patent: Feb. 19, 2002

(54) TELECOMMUNICATIONS NETWORK MANAGEMENT METHOD AND SYSTEM

(75) Inventors: Matthew Faupel; Graham French, both of Cambridge (GB)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/091,303
(22) PCT Filed: Dec. 20, 1996
(86) PCT No.: PCT/FI96/00686
 § 371 Date: Jun. 15, 1998
 § 102(e) Date: Jun. 15, 1998
(87) PCT Pub. No.: WO97/24662
 PCT Pub. Date: Jul. 10, 1997

(30) Foreign Application Priority Data

Dec. 28, 1995 (GB) .............................. 9526595

(51) Int. Cl.[7] .............................. G06F 9/44; H04L 12/24
(52) U.S. Cl. .......................................... 709/224; 370/255
(58) Field of Search ................................ 709/223, 224, 709/203; 370/254, 255, 256, 249

(56) References Cited

U.S. PATENT DOCUMENTS

| 5,241,673 A | 8/1993 | Schelvis ..................... 707/206 |
| 5,485,613 A | 1/1996 | Engelstad et al. .......... 707/206 |
| 5,859,981 A * | 1/1999 | Levin et al. ................. 709/203 |

OTHER PUBLICATIONS

1992, Kantola, et al., International Switching Symposium, vol. 1, "Diversification and Integration of Networks and Switching Technologies Towards the 21st Centruy", pp. 75–79.

1983, Aho, et al., *Data Structures and Algorithms*, pp. 222–226.

Jun. 1997, A copy of the International Search Report for PCT/FI96/00686.

* cited by examiner

Primary Examiner—Mark H. Rinehart
Assistant Examiner—Marc D. Thompson
(74) Attorney, Agent, or Firm—Altera Law Group, LLC

(57) ABSTRACT

The invention relates to a management method and a management system for managing a telecommunications network. The system comprises a database including information about the managed network, said information being in the form of objects that relate to the network elements to be managed and in the form of references between the different objects, said references indicating the dependencies between the objects. To provide a rapidly operating system in which arbitrary circular dependencies between the objects can easily be coped with to decide when an object can be unlocked to allow any part of the system to change said object, an auxiliary data structure that has no cyclic dependencies between its objects is added to the system and this auxiliary data structure is utilized to decide when an object can be unlocked.

6 Claims, 6 Drawing Sheets

TELECOMMUNICATIONS NETWORK MANAGEMENT METHOD AND SYSTEM

Figure 1:
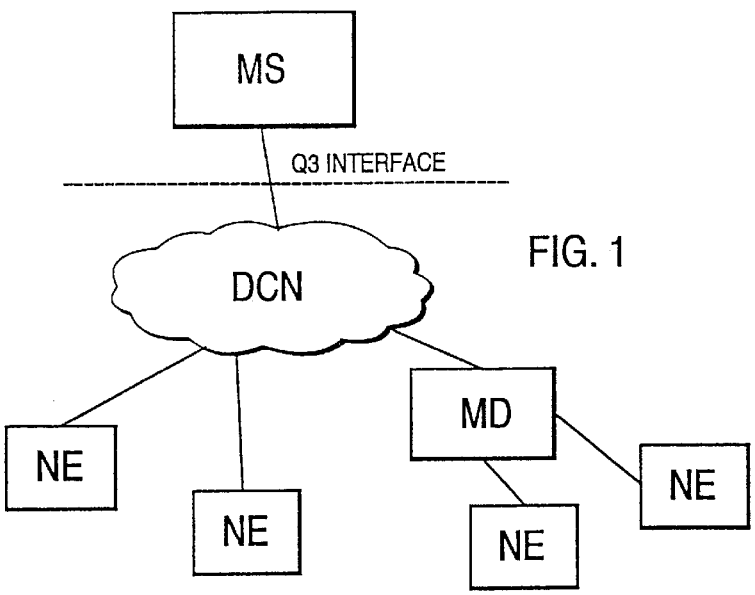

The present invention relates to a management method according to the preamble of the attached claim 1 for managing a telecommunications network, and to a telecommunications network management system according to the preamble of the attached claim 6. The telecommunications network to be managed may be e.g. a SDH (Synchronous Digital Hierarchy) network, a PDH (Plesiochronous Digital Hierarchy) network, or a combination of such networks.

The basic situation in network management is usually such that an operator managing a telecommunication networks, e.g. a telephone company, has a plurality of customers (i.e. network users) in addition to the physical network. The operator sells the customers various services that utilize the network. (A public network will be used herein as an example; in principle, however, the same description applies to a private operator managing e.g. an organization network). To meet customers' data transmission requirements in the physical network, the operator utilizes a number of facilities or operative processes for the provision of customer services. These operative processes can be divided into groups in accordance with the functions for which they are intended:

Service Provisioning taking care of the performance of customer services, including e.g. invoicing customers for services.

Operation & Maintenance for keeping the network operative to allow the usage of customer services. One of the most important functions in this respect is the supervision and repair of network faults.

Planning & Development, the function of which is to develop network operation so as to better meet customers' needs and to increase the overall profitability of the operator enterprise.

As appears from the above, network management takes place on several different levels, depending on the extent to which the functions to be performed on a specific level are associated with the overall management of the operator enterprise. The management of a telecommunications network is generally divided into four different levels, which are from bottom to top as follows:

network element management layer,
network management layer,
service management layer, and
business management layer.

This division is used e.g. in the ITU-T (the former CCITT) recommendation M.3010, which specifies a kind of framework for the management architecture of a telecommunications network. The bottom layer below the above four layers is the equipment itself; these equipments are managed by installation and field engineering tools.

The network element management layer means the management of an individual network element (such as a multiplexer or a cross-connection device) as a separate component without simultaneously paying attention to the condition of the network or other network elements. The majority of so called "network management" systems commercially available today are actually network element management systems within this layer.

The network management layer is concerned with the management of the entire telecommunications network, such as overall management of network connections. One example is the creation of connections and the end-to-end supervision of their condition. This means that e.g. alarms detected on equipment are not just displayed against that equipment, but they are also propagated to show what services (paths and circuits) are affected by the fault, if any. The present invention is positioned in this layer.

As distinct from the above, the service management layer is not concerned with technical network management. It takes care of e.g. customer data, supervision of services provided to customers, invoicing for services, and considering needs for services of different types.

The business management layer is used to monitor and plan the business activities and economy of the entire enterprise, resulting in decisions affecting the lower levels.

At present, network management systems are changing into systems that manage the telecommunications network as a whole, whereas conventional management systems have handled only the remote control of transmission equipment, especially monitoring alarms produced by the equipment. In conventional network management methods, configuration changes, such as creation of new end-to-end connections, have been laborious and time-consuming, as the end result consists of several configuration events the prerequisite of which is that the maintenance staff of the network first gets an overall view of the situation and then decides on configuration changes required in individual network elements. In new network management systems, on the contrary, an overall view of the network and its condition is produced within the system, and the system itself gives the required configuration commands to each transmission equipment. As a consequence, all configuration changes can be performed significantly more rapidly than previously. Such developments have been accelerated by the freeing of competition in the field of telecommunications.

The above-mentioned recommendation M.3010 specifies the management architecture as shown in FIG. 1. The architecture basically consists of one or more operations systems OS connected to a data communication network DCN communicating with an actual telecommunications network which is to be managed and which includes the network elements NE managed. It is to be noted that the connections of the data communications network and those of the telecommunications network are logically distinct, although they can be implemented physically in one and the same cable. Logically, there are thus two networks: (a) a network providing services to customers, and (b) a network maintaining the service provisioning network. The management of certain transmission equipments (network elements) further requires a separate Mediation Device MD, which mainly acts as a protocol converter between a Q3 interface complying with the recommendations and transmission equipments that do not understand the protocol applied in the interface but use their own proprietary protocol. New SDH equipment, for instance, can be connected directly to the Q3 interface, whereas older PDH equipment requires a Mediation Device.

Figure 2:
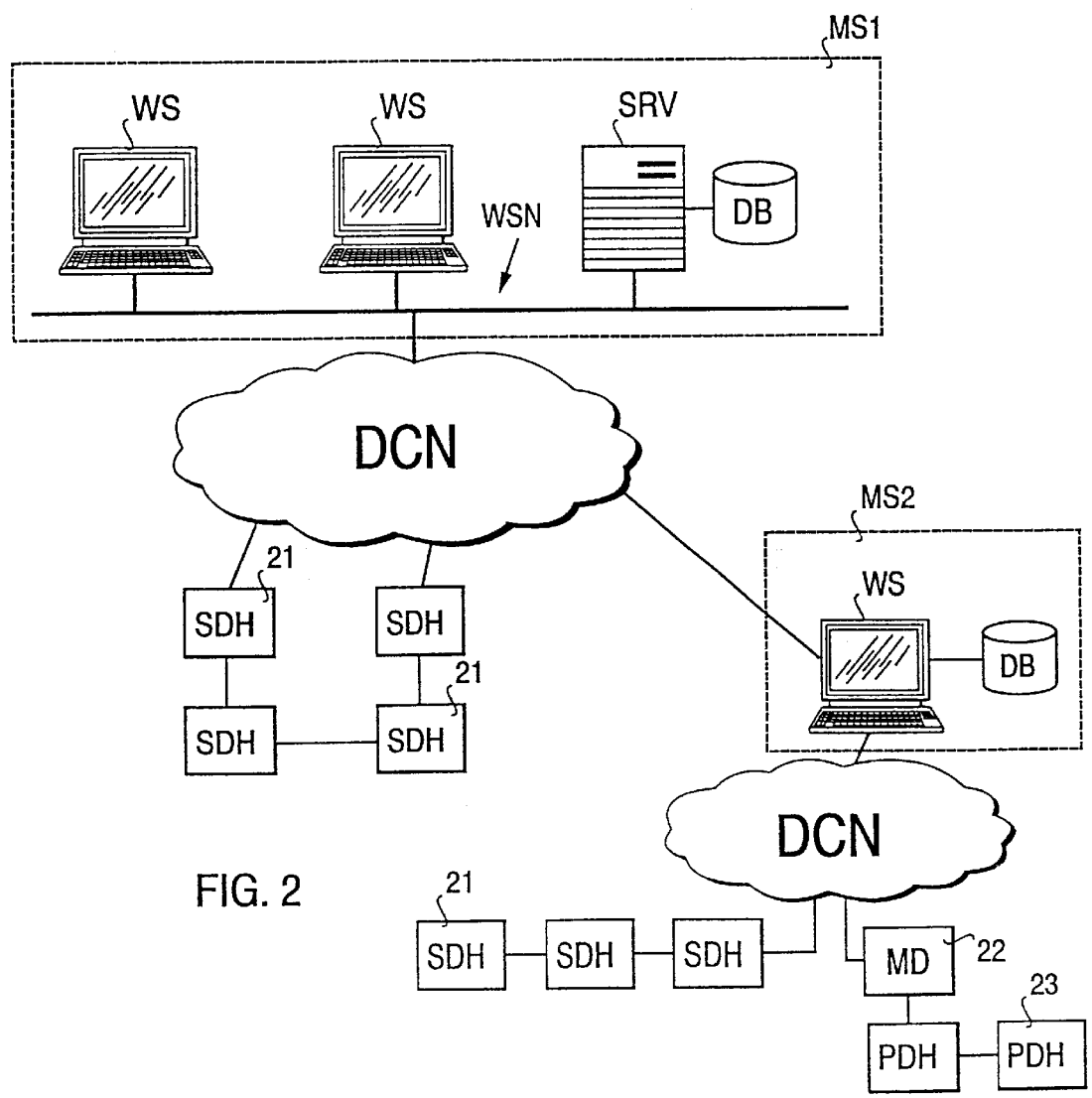

In practice, a management network for a combined SDH and PDH network may be e.g. such as shown in FIG. 2. Users (network operator staff) sitting at the operation centre use network management work stations WS connected to a separate local area network WSN, which may be e.g. an Ethernet network. The management system is typically distributed in several computers of the local area network, one of the computers being a dedicated application server SRV having a database DB containing information necessary for managing the network. In its practical embodiment, the local area network further comprises e.g. necessary back-up devices (like DAT drives or mirrored disks) and event-logging printers (not shown).

The management system is connected via the above-mentioned Q3 interface e.g. to the SDH network. A variety of alternatives have been defined for the Q3 interface, so that the interface may be e.g. an X.25 type packet switched interface or an Ethernet LAN interface. (The packet switched interface is useful if the operator in charge of the network management also otherwise uses a packet switched network.) In practice, control channels between the SDH network elements 21 are established in the overhead bytes of the STM-N signal (N=1, 4, 16), so that control signals between SDH equipments propagate with the payload signal (that is, also in the same physical network). Such control channels established in the overhead bytes are called Embedded Control Channels, and they are formed e.g. in the STM-1 frame by the section overhead bytes D1 to D12.

PDH equipments, on the contrary, need manufacturer-specific solutions, wherefore they have to be connected to the management system through a separate mediation device 22.

The management system may also be hierarchical so that different geographical areas have their own smaller management systems that together form an integral management network. For instance, a management system covering one country may be divided geographically into smaller management systems operating in different parts of the country. Each smaller management system takes care of the management of the network portion in the concerned geographical area. In the example of FIG. 2, management systems MS1 and MS2 geographically apart from each other form together a single common management system and management network.

Network management standards are nowadays largely based on so-called object-oriented descriptions, though the standards do not require the use of this technique. Objects are data structures in a network management system, which describe the functions and state of a network component. An object is thus an element having certain attributes ("I am like this") and certain operations ("I can do these things"). (In the object-oriented approach, objects with the same data structure (attributes) and the same behaviour (operations) are grouped into a class. A specific implementation of an operation is called a method and each object is said to be an instance of its class.) A typical object is e.g. a cross-connection device with certain attributes (cross-connections that are active) and certain methods (e.g. make cross-connection and release cross-connection).

In a telecommunications network management system, objects can be physical ones or logical ones. Physical objects are elements that form part of the physical network. Such objects are e.g. the above-mentioned network elements (a network element is any piece of telecommunication equipment that works as a single unit to provide telecommunication functions) or physical connections (such as optical fibres, twisted pair cables, coaxial cables, radio links or satellite links). Logical objects are logical entities that do not form a single piece of the physical network. Such objects are e.g. paths and circuits. (A path is a connection of a fixed bit rate and format between two physical interfaces within the network. A circuit is a connection set up for a customer, between two physical interfaces on the boundary of the network. Thus, a circuit usually comprises several consecutive paths.)

A network object may have a number of different attributes. Some attributes (such as "fault state") are used by several different types of object. In addition, for some types of network object (such as a route), it is convenient to define an attribute which consists of a collection of other attributes.

Typical attributes are e.g. "availability status", "fault state" and "operational state". The attributes have different possible values, e.g. fault state can have values:

OK. There are no problems.

Warning. There are outstanding faults, but these do not effect services.

Degraded. Some or all of the services provided by the object are degraded.

Failed. All the services provided by the object are lost.

Unknown. The fault state of the object is unknown.

The "operational state", in turn, can have e.g. two different values:

Enabled. The object can operate, either completely or in part.

Disabled. The object cannot operate at all.

Figure 3:
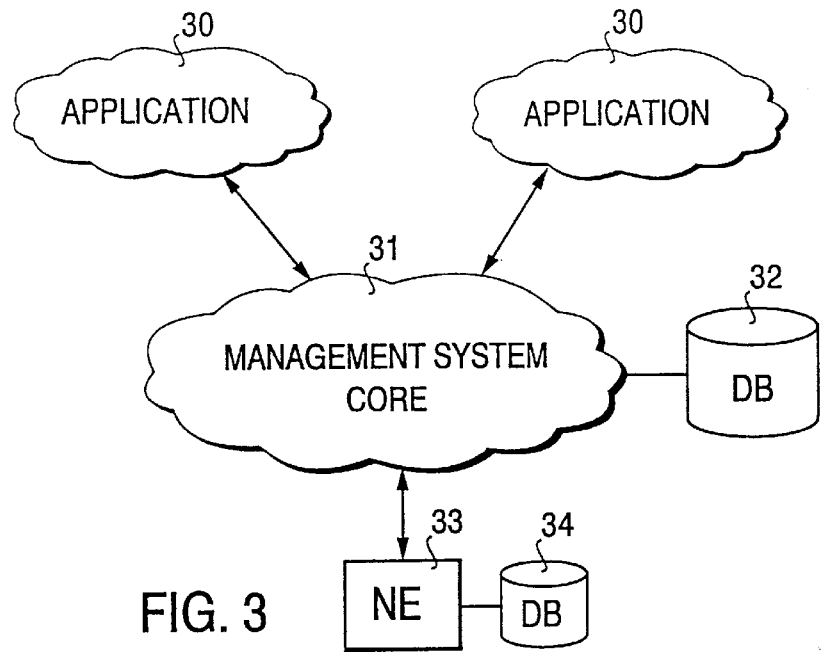

The architecture of a network management system may also be presented in a simplified form as shown in FIG. 3. Users (people managing the telecommunications network) sitting at an operation centre and monitoring the situation of the network on the display of a work station start and terminate applications 30 to manage the network. (The applications are thus very transient elements). Applications are part of the system containing the user interface functionality. The applications offer users the above-described services, such as end-to-end connection management, network optimisation and fault management. The applications converse with the management system core 31, which is a background process e.g. keeping record of events and maintaining a management database 32, i.e. a view of the network. In addition, the core gives the applications 30 information about the managed objects when the applications request such information. Correspondingly, the applications can change the attributes of an object in the database 32, in which case the function of the core is to inform the concerned network element 33 (which may also be the Mediation Device) of the change. The network element comprises its own (limited) database 34, which contains objects related to this specific element.

In principle, the database 32 contains the data of all of the physical elements of the network. It also contains a number of logical entities, such as objects describing customers and (end-to-end) customers connections. The data are interrelated so that an inquiry can be made e.g. about the connections of a specific customer or the customer on a specific connection. (It is to be noted that the physical network comprises no element describing the entire customer connection, but the network comprises a plurality of separate elements each describing a small portion of a connection.)

While an application is using objects, they must be held in the application's memory. When an application wishes to change these objects, they must first be locked to prevent other applications from changing them at the same time.

Due to the complex dependencies between objects, holding one object in memory may require another to be held as well. Similarly, locking one object may require others to be locked. To give an example, when an application locks a path object so as to change its route, it must also lock the objects that represent the network elements that will change as a result.

The complete model used to represent the network is almost always very large. The network can have tens of thousands of pieces of equipment and each of these can have a number of objects associated with it, whereby there can be even fifty to a hundred thousand objects representing a network. In practice, this is too much information to be kept in central memory at the same time. Therefore, the same technique can be applied both to throwing objects away from the memory when no longer required (so as to minimize memory use) and unlocking them. Consequently, what is said about lock management in the following also applies to memory management.

The dependencies between the objects are, in general, hidden from the application (and user) so that the application just locks the path and the network elements are locked automatically. Similarly, when the application has completed its operation it frees the object from memory and/or unlocks it, and all the other objects on which it depends are freed and/or unlocked.

The problem behind the present invention is that of this unlocking and/or freeing, i.e. the problem how to check the dependencies between the objects to be able to perform this unlocking and/or freeing in a correct way. The solution to this problem is non-trivial, because the dependencies between objects can be cyclic, i.e. object A depends on object B which depends on object C which depends on object A. (It is to be noted that the problem of dependency checking is related only to unlocking, not to locking, because when an object must be locked, it is clear that all the objects that this object references must be locked. However, when the object is unlocked, other operations going on at the same time may require the same object to be kept still locked, although the operation that originally caused the locking does not any more require this.)

In the prior art there are a number solutions to this problem of dependency checking. The solutions fall into two broad categories: (a) reference counting and (b) garbage collection. These two categories are illustrated in the following.

In the reference counting method, a count is associated to each object. Each time an object is referenced by another object, the count associated with that object is raised. Each time the reference is removed the count is reduced. When the count reaches zero, the object can be freed and/or unlocked. Also, any references from that object to others can be removed as well, possibly causing further freeing and/or unlocking to take place.

Figure 4A:
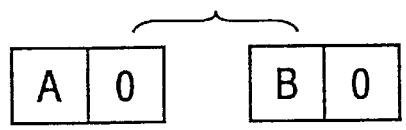
Figure 4B:
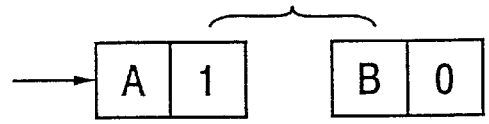

FIGS. 4a . . . 4e demonstrate how the reference counting method works. In the figures, two different objects, A and B, have been shown, each being marked by a box labelled by the corresponding letter (A or B). Associated to each object box is the count box, labelled by the value of the corresponding counter. Initially (FIG. 4a), objects A and B have no references to them, whereby the associated counter values are zero. Then (FIG. 4b), something from outside references A (as shown by an arrow), whereby its reference count is incremented to one. (In practice, a reference from an object to another, indicating a dependency between those objects, can be implemented in any possible ways, e.g. by means of a pointer word, i.e a binary number the value of which corresponds to the object it is pointing to.)

Figure 4C:
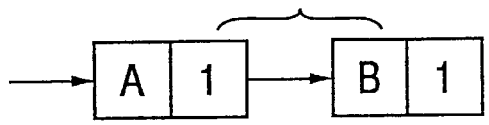
Figure 4D:
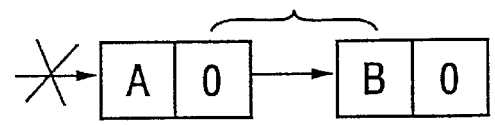
Figure 4E:
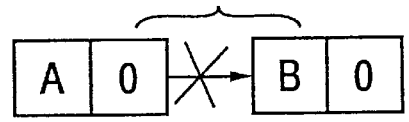

After that (FIG. 4c), object A references object B, so the reference count of object B is incremented. If the external reference to object A is then removed, the count of object A is reduced to zero (FIG. 4d). When this happens, all references from object A to other objects are also removed (FIG. 4e). Thus, in the example, the reference count of object B is also reduced to zero.

Figure 5A:
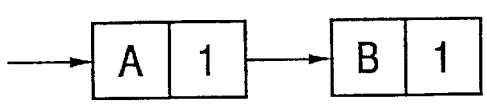

This kind of a solution is insufficient in a network management system, as it cannot cope with circular dependencies. Objects which are mutually dependent end up keeping the count at a value greater than zero because they refer to each other even though nothing else refers to them. This is illustrated in figures 5a . . . 5d.

Figure 5B:
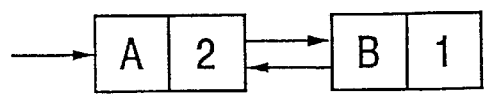
Figure 5C:
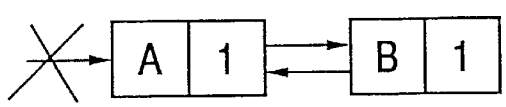
Figure 5D:
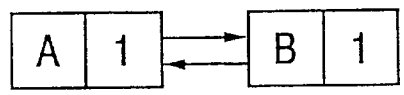

The initial situation (FIG. 5a) is such that object A references object B and something from outside references object A. Then (FIG. 5b), object B creates a reference back to object A; this increments the reference count of object A to two. If the external reference is now removed, the reference count of object A is still one because object B is still referencing it (FIG. 5c). This leads to the situation of FIG. 5d, where neither object A nor object B can be freed or unlocked because each has a reference count of one, but the only things actually referencing the objects are the objects themselves, i.e. the objects could actually be unlocked but the incorrect value of the reference count prevents it.

The second common form of dependency checking, called garbage collection, is based on a different approach. In garbage collection, all the links from a known root object or objects are periodically followed to all other objects, and each object that is reachable is marked as being still in use. Then all other objects that are no longer reachable are freed and/or unlocked.

What is used as the root object or objects varies from system to system depending on how the objects are designed to be linked together. For example, if garbage collection were used for the network management system, the root objects would be those objects that had been specifically fetched and/or locked by the application using them; any objects that could no longer be reached from those objects could be freed and/or unlocked.

Figure 6A:
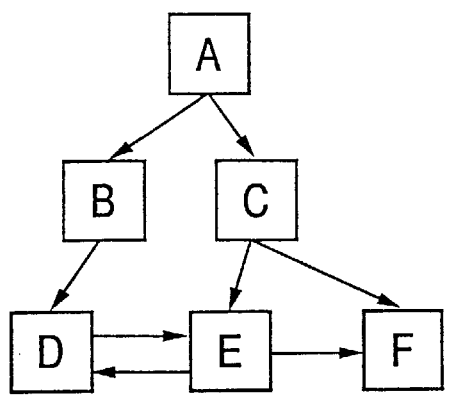
Figure 6B:
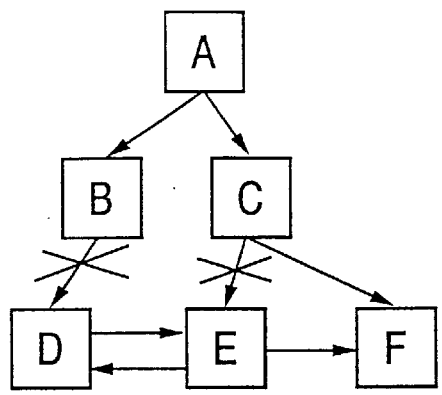
Figure 6C:
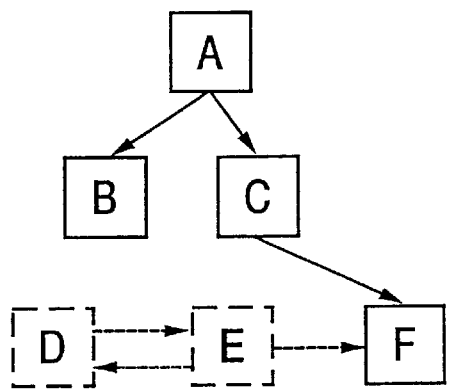
Figure 6D:
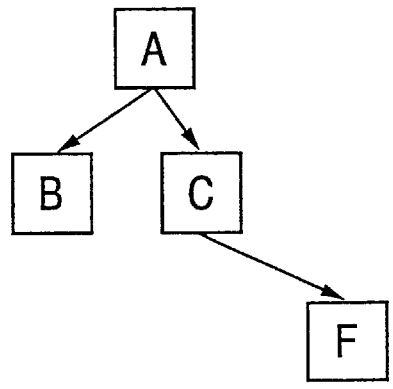

The example of FIGS. 6a to 6d shows how garbage collection works. FIG. 6a shows a group of objects A . . . F with links between them, including a loop dependency between two objects, D and E. FIG. 6b shows two links being removed, with the result that objects D and E are no longer referenced by any other objects. Some what later (FIG. 6c), all the links reachable from the known root object (A in the example) are followed and all the reachable objects are marked. Reachable links and objects are shown in solid lines in FIG. 6c, the others in dotted lines. After all reachable objects have been found, those that are no longer reachable are freed or unlocked. The result is shown in FIG. 6d.

This approach deals with the problem of circular references (as demonstrated by the removal of D and E in the example), but is unsuitable for network management systems for the following reason.

Garbage collection does not find the unused objects as soon as they are unused. It is unacceptable for a (rapidly operating) network management system to have a delay between when an object is no longer used and when it is unlocked, as there may be many other applications waiting to use the object.

The purpose of the present invention is to provide a novel solution for the locking management in a telecommunications network management system, not showing the above-mentioned drawbacks. This is achieved by means of the method according to the invention, which is characterized by what is set forth in the characterizing portion of the attached claim 1. The system according to the present invention is, for its part, characterized by what is set forth in the characterizing portion of the attached claim 6.

The dependencies between objects in the network management system can be regarded as a data structure known as a Directed Graph (DG). This represents the objects as nodes in the graph with directional links between the nodes as the dependencies. Following the links from a node can lead back to that node; it is this feature that leads to e.g. reference counting in its basic form being inapplicable to lock management, as mentioned earlier.

A related data structure is the Directed Acyclic Graph (DAG); this is identical to the Directed Graph, except that it has the property that no node can link back to itself either directly or indirectly. The idea of the invention is to add to the system an additional data structure so that the dependencies between the objects can be viewed in a DAG form, to maintain this structure as a DAG after any changes in dependencies between the objects, and to use simple reference counting in connection with this additional data structure to decide when objects can be unlocked and/or freed. A technique for converting DGs to DAGs already exists (see Aho, Hopcroft & Ullman: Data Structures and Algorithms, pp 222–226, Addison-Wesley, 1985, ISBN 0-21-00023-7). This technique works by identifying all nodes in the old DG that form a circular dependency and combining them to form a single node in a new DAG.

In the present invention this technique is applied to the problem of dependency management in a telecommunications network management system, with the inclusion of various optimisations to minimise the overhead involved in maintaining the data structure. Thus, the idea of the present invention is to maintain in the system an auxiliary data structure that does not include cyclic dependencies between the objects, and to utilize reference counting in connection with this data structure. The system according to the present invention can be viewed as having two overlapping data structures: a first data structure including the objects and the references between them, and a second (auxiliary) data structure including the groups (of mutually dependent objects) and the references between them.

The advantage of the present invention over existing reference counting approaches is that arbitrary circular dependencies can be coped with. The advantage of the present invention over the known garbage collection method is that by means of the present invention an object becomes unlocked as soon as it is no longer required to be locked. The present invention also has the benefit of spreading the computational load over each lock/unlock operation rather than having it all occur at once.

Below, the invention and its preferred embodiments will be described in greater detail with reference to the examples of FIGS. 7a . . . 7h of the attached drawings, in which FIG. 1 illustrates a telecommunications network management architecture, FIG. 2 shows an example of a management network for a combined SDH and PDH network, FIG. 3 illustrates the architecture of a network management system in a simplified form, FIGS. 4a . . . 4e demonstrate the function of one prior art method for lock management, FIGS. 5a . . . 5d demonstrate the function of the prior art method in a system having mutually dependent objects, FIGS. 6a . . . 6d demonstrate the function of another prior art method for lock management, FIGS. 7a . . . 7h demonstrate the function of the method according to the present invention.

The following description deals only with how lock management is carried out using this technique, however, as mentioned above, the same technique can also be used to handle memory management.

According to the present invention, each lockable object has another simple lock group object associated with it. This lock group object acts as a sort of tag indicating which node within the DAG the lockable object belongs to. Further, it is this lock group object that maintains the count of how many times the object(s) within the group has (have) been locked. When the count returns to zero, the object(s) is (are) unlocked.

When one lockable object locks another, if this additional reference causes a circular path to be formed then all the lock groups of all the objects in the circular path are combined into one new group. This new group is then used as the single lock group object for all of those lockable objects. Thus, the lock group objects behave as nodes in a DAG because there can never be circular references between them, and so simple reference counting using these objects is feasible.

The procedure followed when a new target object (belonging to the target lock group) is locked by a source object (belonging to the source lock group, which is different from the target lock group) is as follows (in the description an object referencing to another is called a parent whereas the object referenced to is called a child):

1. Starting with the object just locked (the target), mark the object and check each child object that the target object has locked (see below) to try to find the lock group of the source object. If it can be found, there is a dependency loop.

2. Each child is checked as follows:

2a. If the child belongs to the source lock group, increment the count of internal links and note that the source group (and thus a loop) has been found.

2b. If the child is already marked, note that the source group has not been found.

2c. Else mark the child and check each of its locked children (i.e. repeat step 2 for the child's children).

2d. If any checked child (recursively) belongs to the source group, a loop has been found: if this child is not in the same group as the parent checking it, merge its lock group with the source lock group and increment the count of internal links.

3. If a loop was found, merge the target group with the source group, but remove the count of internal links found from the total count of references to the source group (so that only external references to the group are counted).

In the following the above-described principle is illustrated by an example showing what happens when a new link is created that causes a circular reference to appear.

Figure 7A:
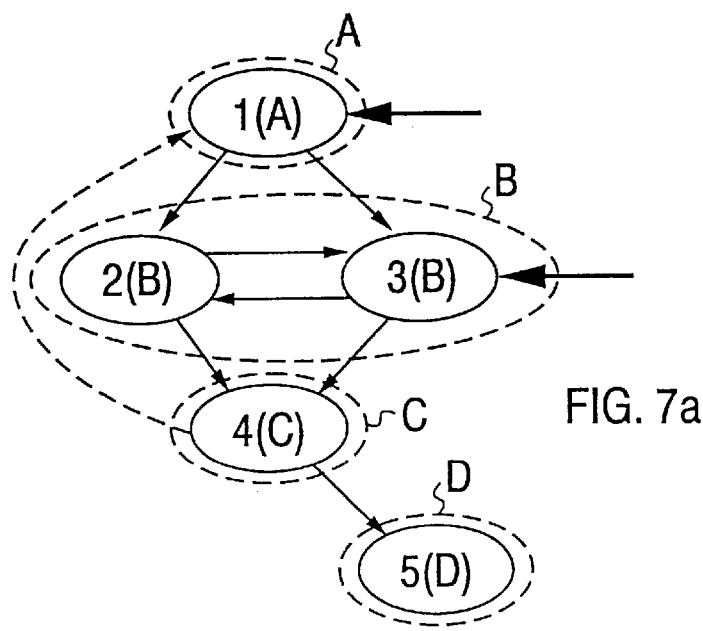

FIG. 7a shows five objects (numbered 1 to 5) and the reference groups they belong to (indicated by the dotted ovals and labelled A to D). The thin arrows indicate internal references and the thick arrows references from outside. The dotted arrow is the new link that is just being created.

At the initial stage of FIG. 7a the various counter values to be kept track of are (as can be seen from the figure):

References to group A: 1

References to group B: 3

References to group C: 2

References to group D: 1

Count of internal links L=0.

In the following, the numbering corresponds to the numbering of the method steps described above.

Figure 7B:
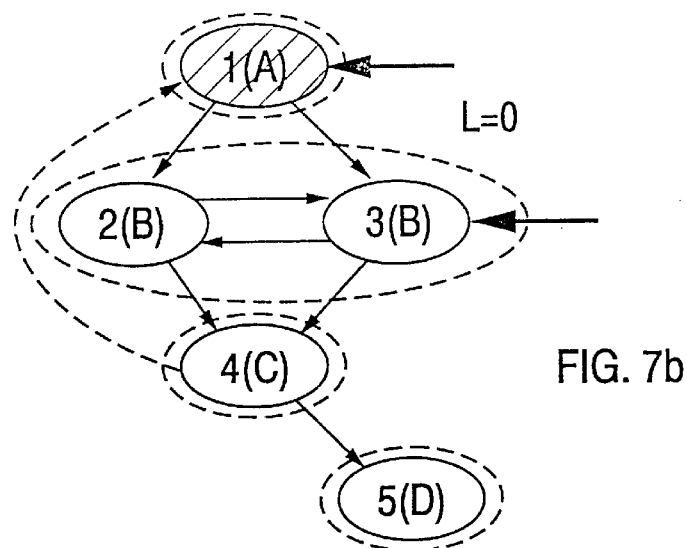

1. Start at target object (object 1), mark it and check children. Marking has been illustrated in FIG. 7b by a shaded oval.

2. Check child of 1 (object 2).

2a. Object 2 is not part of the source group (C), so do not proceed (do not increment the count of internal links).

2b. Object 2 is not marked, so this item does not apply.

2c. Mark object 2 and check its children.

Figure 7C:
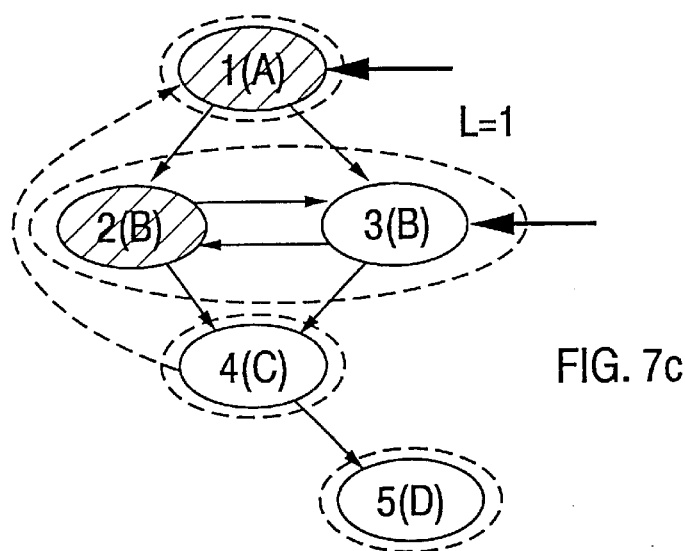

2. (FIG. 7c) Check child of object 2 (object 4).

2a. Object 4 is part of the source group (C), so increment the count of internal links.

Figure 7D:
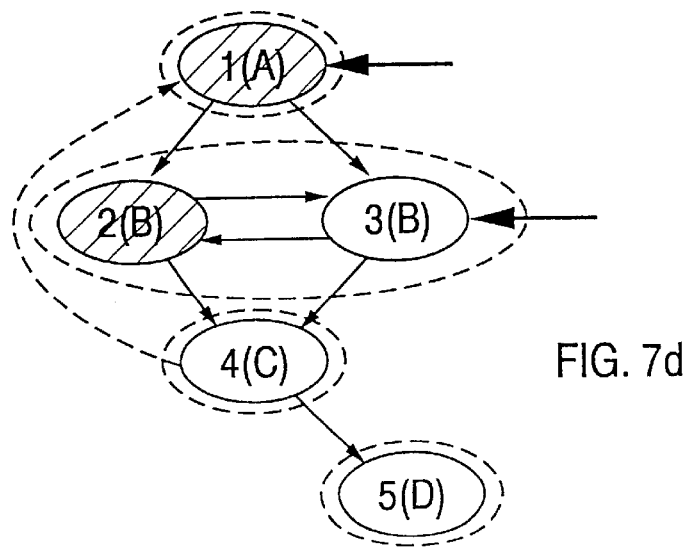
Figure 7E:
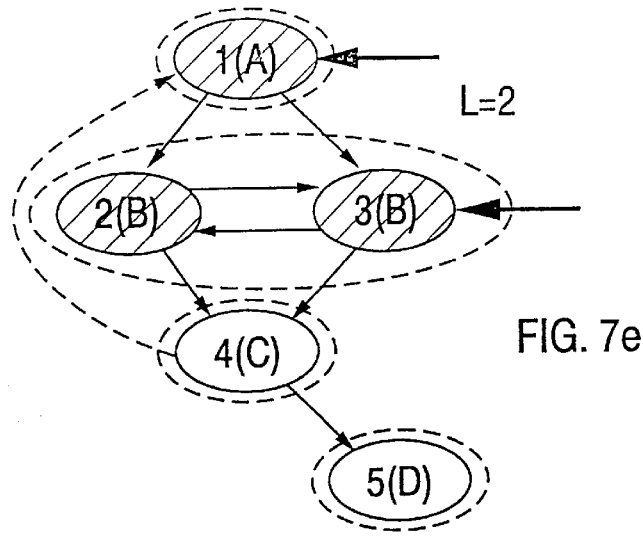
Figure 7F:
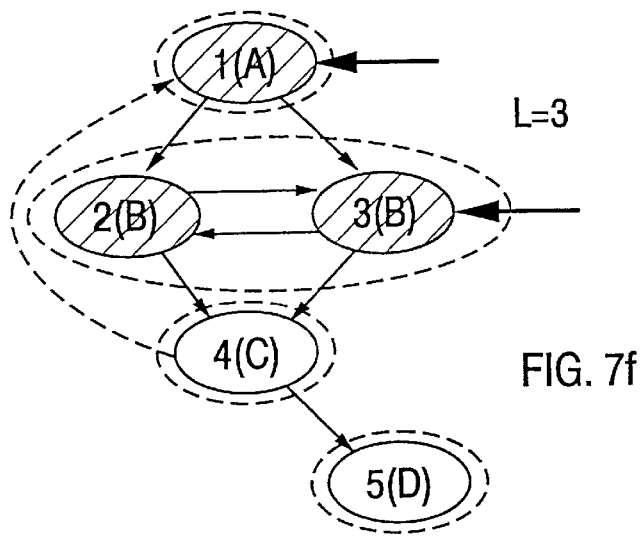
Figure 7G:
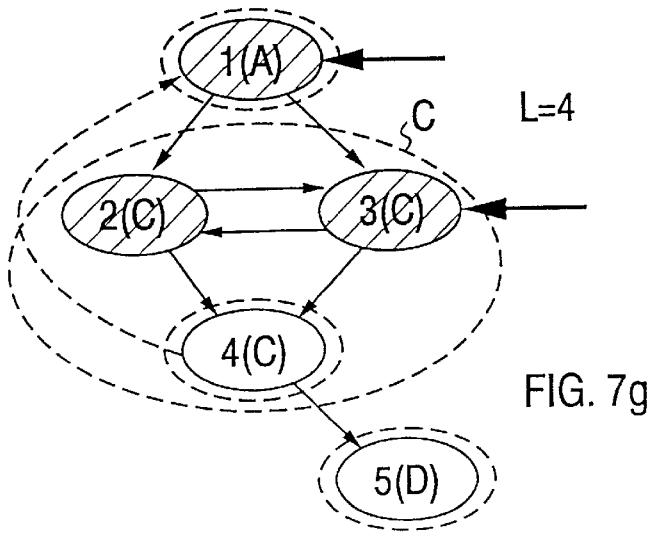
Figure 7H:
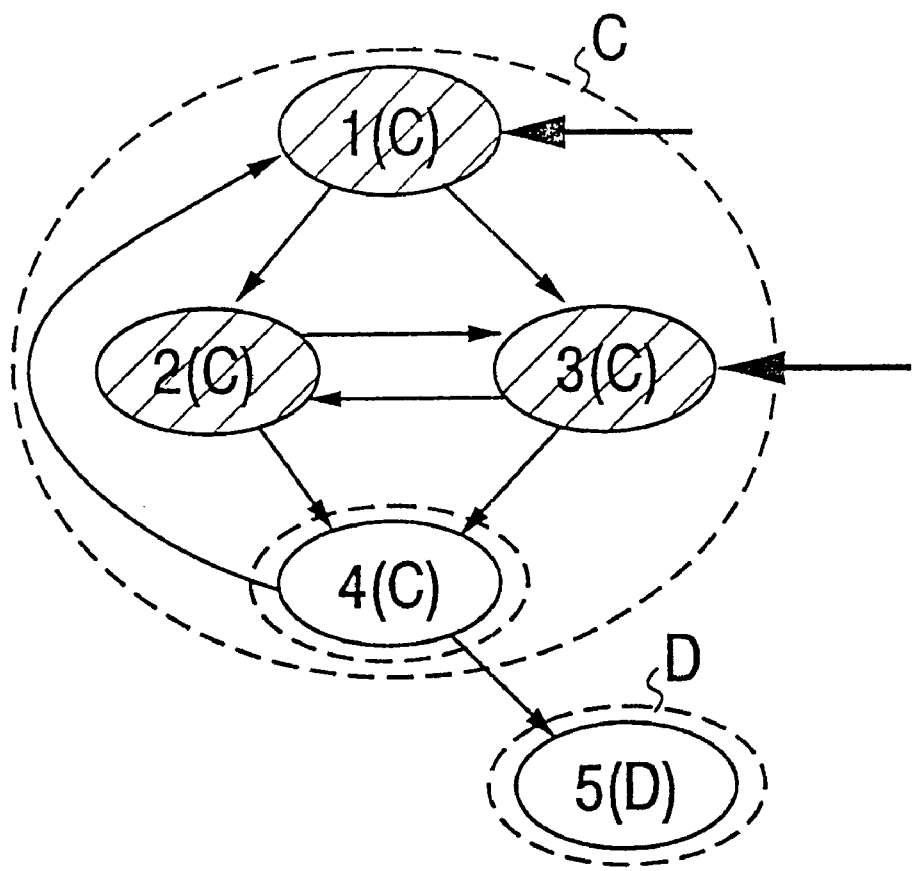

Count of internal links: L=1
2. (FIG. 7d) Check child of object 2 (object 3).
2a. object 3 is not part of the source group (C), so do not proceed.
2b. Object 3 is not marked, so this item does not apply.
2c. Mark object 3 and check children.
2. (FIG. 7e) Check child of object 3 (object 2).
2a. Object 2 is not part of the source group (C), so do not proceed.
2b. Object 2 is already marked, so it is not in the source group (C).
2. Check child of object 3 (object 4).
2a. Object 4 is part of the source group (C), so increment count of internal links.
Count of internal links: L=2
2d. We have now checked all children of object 3 and found out that we can access the source group (C), but this child (object 3) was checked from a parent (object 2) in the same group (B), so do nothing more.
Return to parent of object 3, object 2.
Back at parent of object 3, object 2 (see FIG. 7f).
2d. We have now checked all children of object 2 and found out that we can access the source group (C). As this child (object 2) was checked from a parent (object 1) in a different group (A), the group (B) of this child is merged with the source group (C) and the internal link count is incremented.
References to the new group C (see FIG. 7g) are now 5 (=B+C=3+2).
Internal link count: L=3
Return to parent of object 2, object 1.
Back at parent of object 2, object 1.
2. Check child of object 1 (object 3).
2a. Object 3 is part of the source group (C), so the count of internal links is incremented.
Count of internal links: L=4
All the children of object 1 have now been checked, and (in this case) both of them were linked to the source group (C), so we can move to step 3:
3. Merge the target group (A) into the source group (C), but remove the count of internal links.
References to C: 2 (=A+C−L=1+5−4).
The end result is shown in FIG. 7h: Objects 1, 2, 3 and 4 are now all in the same group (C) and the reference count to that group is 2.

As a result, objects 1 to 4 are now all in the same group (C) and the reference count for that group is the correct count of the number of references to it from outside the group. After this, simple reference counting can be used to decide when objects of a certain group can be unlocked. That is, when the reference count reaches a predetermined value (showing that the number of references to that group is zero), the references from that group are removed. Depending on the chain of references, this can cause further unlocking to take place.

In the above-described manner the smallest new group that no longer has a cycle in it (like group C of FIG. 7h) and reference count to that new group are always worked out when maintaining the data structure after the objects and/or the references between the objects change.

In the above example, the children of each object were followed from left to right and then top to bottom, but the method works correctly whatever the ordering.

The above described recursive checking each time one object is locked by another could be computationally expensive, given that there are potentially thousands of links between the network management system objects. This cost is reduced by the following preferred embodiments of the present invention.

According to the first preferred embodiment the locking of a previously unlocked object requires no further checking (there can be no loop because the object cannot have caused another object to be locked if it itself is unlocked). Hence the recursive descent checking only takes place if the same object is locked from two or more different sources.

The procedure above marks objects to indicate that they have been checked. According to the second preferred embodiment this marking is done by setting e.g. a field in the object to a unique value associated with the source lock group being checked for.

Normally the use of marking would require a second pass over the objects to remove any marks set so that the next time the check is performed the objects can be marked again. This is made unnecessary by the use of the group's unique value because:

if a different group is being checked for, the object will appear to be unmarked, and if the same group is being checked for, the existance of the mark indicates that all children below that object have already been checked for membership of that group and so do not need to be checked again.

Thus, the use of this marking technique avoids computation by removing the need for a mark-clearing pass, and by removing the need to recheck all the objects below a given object if that object has already been marked for the group being searched for.

Though the invention has been described above referring to the example of the attached drawing, it is obvious that the invention is not restricted to that, but it can be modified in many ways within the scope of the inventive idea presented above and in the attached claims. As mentioned above, the management system includes a variety of objects, representing both logical and physical entities. In the enclosed claims all these objects are are set forth as "the objects that relate to the network elements to be managed", i.e. objects that represent the managed environment.

What is claimed is:

1. A method for managing a telecommunications network, said telecommunications network comprising several network elements to be managed by the system, said system comprising a management centre having at least one workstation accomplishing a man-machine interface and allowing a manager to control the system, and the system being capable of providing the manager with information on the network, said at least one workstation being connected to a database including information about the managed network, said information being in the form of objects that relate to the network elements to be managed and in the form of references between the different objects, said references indicating the dependencies between the objects, whereby said management centre is connected to said network elements by data communication links such that the manager can initiate an operation on a managed item of the network, in which method when the information content of an object is changed by an operation, (a) said object and all the objects depending on it are first locked to prevent another operation from changing the information content of said objects at the same time, (b) after said change has been completed a dependency checking is performed to find all dependent objects that can be unlocked, characterized in that an additional (auxiliary) data structure is formed from lockable objects, said data structure comprising object groups formed in such a way that the relationships between the objects within a single group can be cyclic and the relationships between the groups are all acyclic, each group having a count associated with it, said count corresponding to the number of references made to the group from outside, when a source object has created a new reference to a target object, the number of groups and said count are updated so that the relationships between the groups are still all acyclic, and objects within a group are unlocked when said count has a predetermined value.

2. A method according to claim 1, characterized in that when performing said updating, the dependencies between the objects are followed, starting from the target object and checking the groups of the child objects that the target object has locked, while at the same time keeping track of a count of internal links corresponding to the links found between the different groups, and if a child object belonging to the source group is found, the source group is merged with the group of the parent object, provided that the group of the parent object is not the same as the source group.

3. A method according to claim 1, characterized in that when the source group is merged with the target group, the total count of internal links found is subtracted from the total count of references to the merged source group.

4. A method according to claim 1, characterized in that said updating is performed only if the target object is already locked when the source object has created a new reference to the target object.

5. A method according to claim 2, characterized in that an object is marked to indicate that its locked child objects have been checked, said marking being done by giving the mark a value which is unique, to the source group in question.

6. A network management system for a telecommunications network, said telecommunications network comprising several network elements to be managed by the system, said system comprising a management centre having at least one workstation accomplishing a man-machine interface and allowing a manager to control the system, and the system being capable of providing the manager with information on the network, said at least one workstation being connected to a database including information about the managed network, said information being in the form of objects that relate to the network elements to be managed and in the form of references between the different objects, said references indicating the dependencies between the objects, whereby said management centre is connected to said network elements by data communication links such that the manager can initiate an operation on and receive information from a managed item of the network, characterized in that the system comprises an additional (auxiliary) data structure comprising object groups formed in such a way that the relationships between the objects within a single group can be cyclic and the relationships between the groups are all acyclic, each group having a count associated with it, said count corresponding to the number of references made to the group from outside.

* * * * *